United States Patent [19]

Ishii et al.

[11] Patent Number: 5,615,098
[45] Date of Patent: Mar. 25, 1997

[54] AC-DC CONVERTER

[75] Inventors: Takuya Ishii, Suita; Yoshio Mizutani, Moriguchi; Haruo Watanabe, Hidaka; Yoshinori Kobayashi, Hanno; Yutaka Sekine, Iruma; Satoshi Ikeda, Neyagawa, all of Japan

[73] Assignee: Matsushita Electric Industrial Co., Ltd., Osaka, Japan

[21] Appl. No.: 378,773

[22] Filed: Jan. 26, 1995

[30] Foreign Application Priority Data

Jan. 28, 1994 [JP] Japan .................................. 6-008010
Dec. 9, 1994 [JP] Japan .................................. 6-305780

[51] Int. Cl.$^6$ .................................................. H02M 3/335
[52] U.S. Cl. .................................................. 363/84
[58] Field of Search .......................... 363/89, 24, 44–46, 363/16, 19, 20–21, 25, 56, 57, 97, 98; 323/222, 229, 131, 132, 45–46, 275, 285, 34; 361/93, 113

[56] References Cited

U.S. PATENT DOCUMENTS

| 4,209,826 | 6/1980 | Priegnitz | 363/21 |
|---|---|---|---|
| 5,297,014 | 3/1994 | Saito et al. | 363/21 |
| 5,515,261 | 5/1996 | Bogdan | 363/89 |

FOREIGN PATENT DOCUMENTS

| 0387435 | 9/1990 | European Pat. Off. . |
| 0507393 | 10/1992 | European Pat. Off. . |

OTHER PUBLICATIONS

J. Spangler et al., "A comparison Between Hysteretic and Fixed Frequency Boost Converters Used For Power Factor Correction", *IEEE Proceedings of the Annual Applied Power Electronics Conference and Exposition*, 281–286, (Mar. 1993).

European Search Report dated Aug. 4, 1995.

*Primary Examiner*—Aditya Krishnan
*Attorney, Agent, or Firm*—Ratner & Prestia

[57] ABSTRACT

An AC-DC converter which allows an input current of an input AC power source to have harmonic currents of reduced levels and which supplies a stabilized output DC voltage to a load is realized by a simple circuit configuration. The converter has: a converter circuit consisting of a choke coil which receives a rectified voltage from a rectifying circuit, a switch element, and a diode; a smoothing capacitor which smooths the output voltage of the converter circuit and supplies the smoothed voltage to a load; and a control circuit consisting of a current detection circuit, a voltage detection circuit, and a pulse-width control circuit. In order to stabilize the output voltage, the switch element is turned on and off so that the peak value of the input current of the converter circuit is limited in a DC-like manner, thereby allowing the input current to have a trapezoidal waveform.

7 Claims, 6 Drawing Sheets

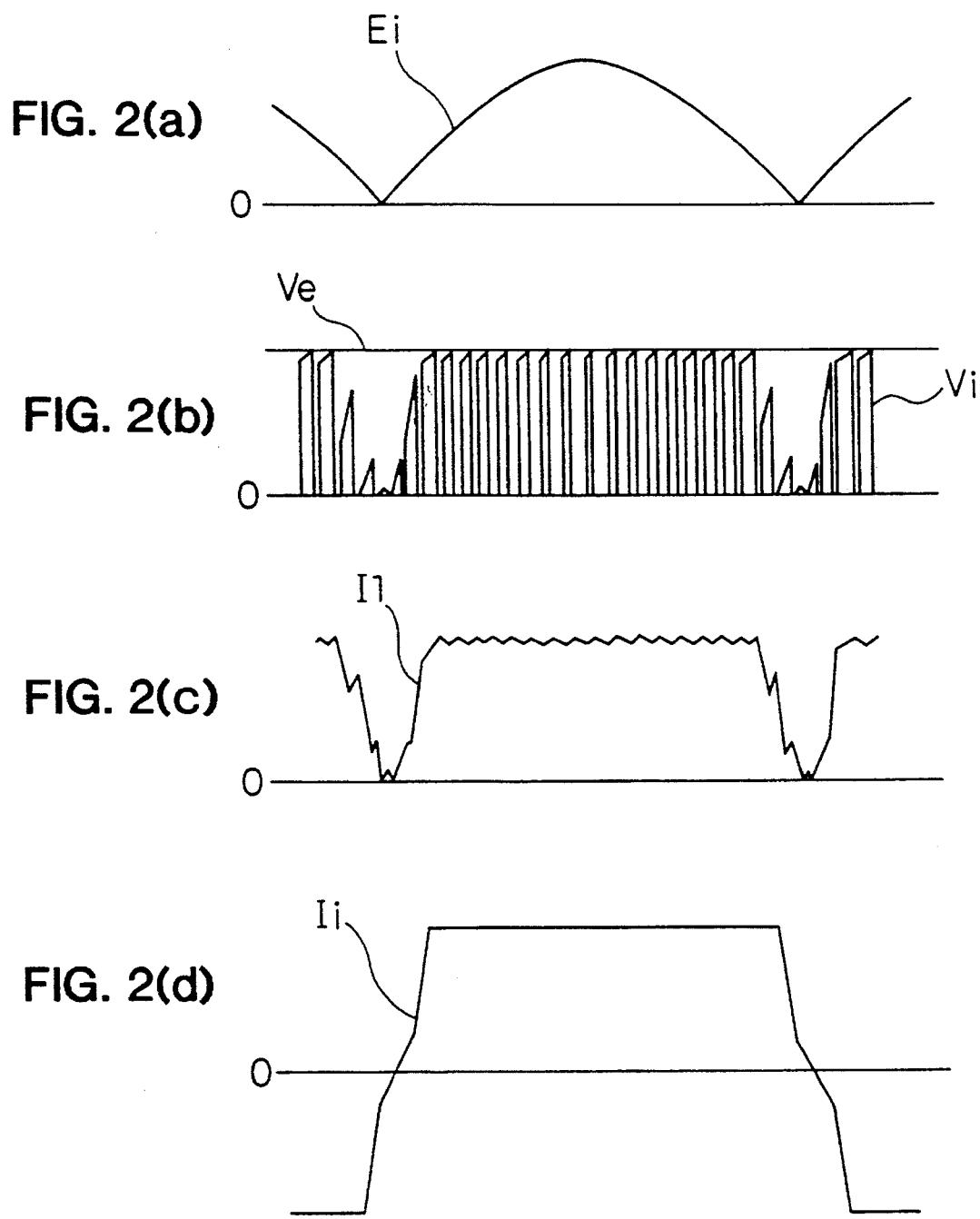

AC-DC CONVERTER

BACKGROUND OF THE INVENTION

1. Field of the Invention

The invention relates to an AC-DC converter which uses an AC power source, particularly a commercial AC power source as an input and which supplies a DC voltage at a high power factor.

2. Description of Prior Art

An AC-DC converter of the prior art is disclosed in U.S. Pat. No. 5,019,952.

A prior art converter having such a configuration allows an input current to have a sinusoidal waveform including harmonic currents of reduced levels. In order to shape the waveform of an input voltage, however, the converter requires a circuit for detecting an input AC voltage, and a multiplying circuit, and hence has a problem in that the circuit scale is enlarged.

SUMMARY OF THE INVENTION

It is an object of the invention to provide an AC-DC converter which, although an input AC voltage is not shaped to a degree at which the voltage has a sinusoidal waveform, has a simplified circuit scale while improving the power factor and reducing the levels of harmonic currents.

In order to attain the object, the AC-DC converter of the invention comprises: a rectifying circuit which receives an input AC voltage and outputs a rectified voltage; a converter circuit comprising a choke coil which receives the rectified voltage from the rectifying circuit, a switch element, and a first diode; a smoothing capacitor which smooths the output voltage of the converter circuit and supplies the smoothed voltage to a load; and a control circuit which controls the switching element to be turned on and off so as to restrict a peak value of an input current of the converter circuit in order to substantially stabilize the output voltage of the converter circuit.

According to the configuration, the number of parts is reduced, currents of the choke coil and the switch element are limited, thereby reducing the current stress, and the input AC current which is smoothed by an input filter has a trapezoidal waveform which is synchronized with the rectified voltage, resulting in that the power factor can be improved and harmonic currents can be reduced in level.

BRIEF DESCRIPTION OF THE DRAWINGS

FIG. 2 is a waveform chart showing the operation of the AC-DC converter of the invention.

DESCRIPTION OF THE PREFERRED EMBODIMENTS

Figure 1:
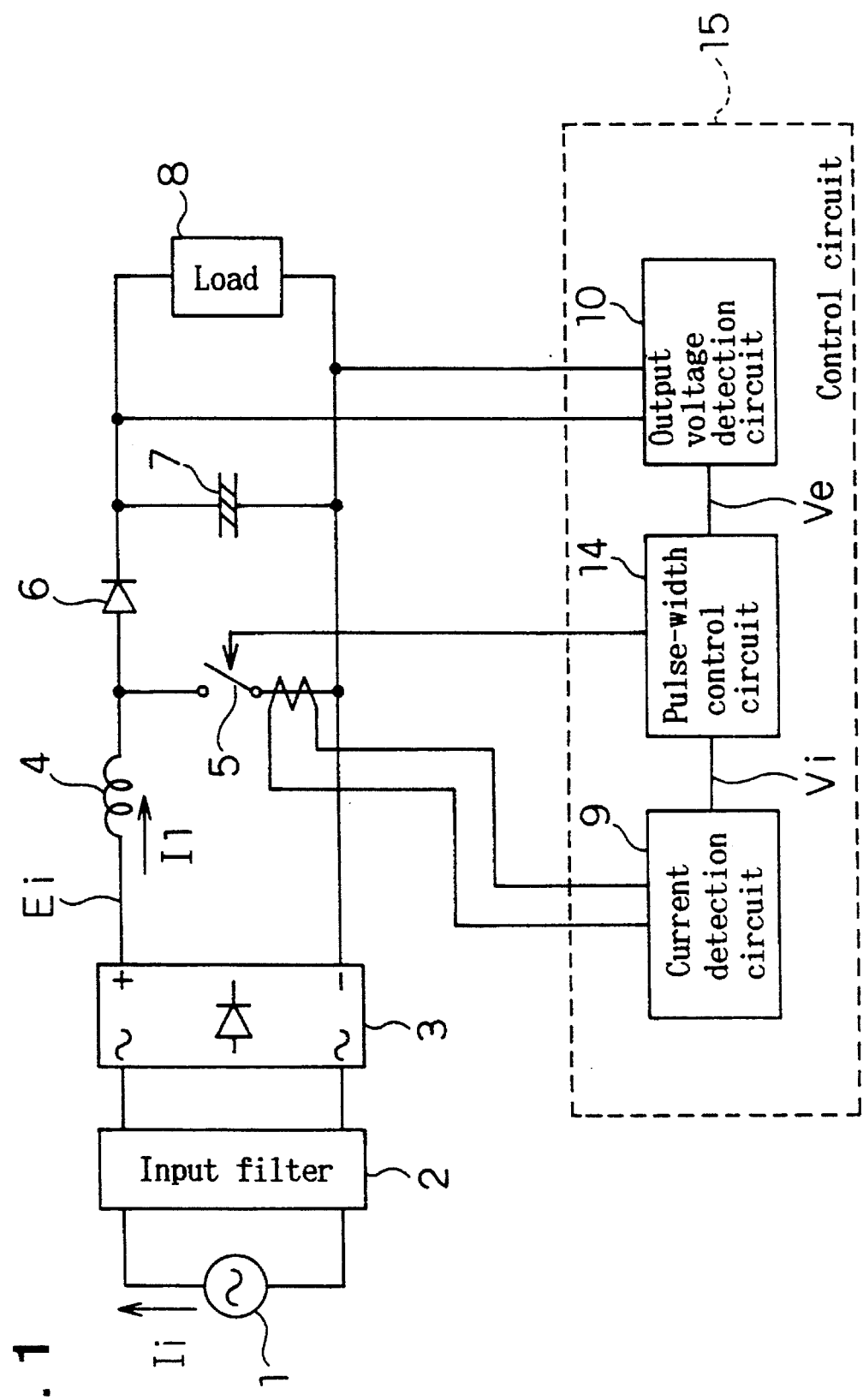
FIG. 1 is a circuit diagram of the AC-DC converter of the invention.

Hereinafter, an embodiment of the invention will be described with reference to the drawings. In FIG. 1, 1 designates an input AC power source, 2 designates an input filter, 3 designates a full-wave rectifying circuit, 4 designates a choke coil, 5 designates a switch element, and 6 designates a diode. The choke coil 4, the switch element 5, and the diode 6 constitute a boost converter. The reference numeral 7 designates a smoothing capacitor which smooths the output voltage of the boost converter and supplies the smoothed voltage to a load 8, 9 designates a current detection circuit which detects a current of the switch element 5, 10 designates a voltage detection circuit which detects the voltage of the smoothing capacitor 7 and compares the detected voltage with a reference voltage to detect a voltage error, and 14 designates a pulse-width control circuit which controls the switch element 5 to be turned on and off at a high frequency. The pulse-width control circuit 14 receives an output signal of the current detection circuit and also that of the voltage detection circuit, and, when the detection current reaches a predetermined level, controls the switch element 5 to be turned off. The current detection circuit 9, the voltage detection circuit 10, and the pulse-width control circuit 14 constitute a control circuit 15.

The operation of the thus configured AC-DC converter will be described with reference to FIG. 2. An input AC voltage is subjected to the full-wave rectification by the full-wave rectifying circuit 3. When the switch element 5 is on, the rectified voltage Ei (FIG. 2(a)) is applied to the choke coil 4. A current flows along the path elongating from the full-wave rectifying circuit 3 to the switch element 5 through the choke coil 4, and energizes the choke coil 4. When the switch element 5 is off, a current flows from the full-wave rectifying circuit 3 to the smoothing capacitor 7 through the diode 6 so that the energization energy of the choke coil 4 is released. The voltage detection circuit 10 has a response characteristic which is lower than the frequency of the input AC voltage, and detects the voltage of the smoothing capacitor 7. The voltage detection circuit 10 compares the detected voltage with a reference voltage and amplifies the difference between the voltages. The amplified voltage difference is output as a voltage error signal Ve which is a DC voltage such as shown in FIG. 2(b). When the output voltage is raised, the level of the signal is lowered, and, when the output voltage is lowered, the level is raised. The current detection circuit 9 outputs a current signal Vi (see FIG. 2(b)) which corresponds to the waveform of the current of the switch element 5. When the rectified voltage Ei is low and the current signal Vi has a low level, the pulse-width control circuit 12 drives the switch element 5 at a predetermined on/off ratio so as to energize the choke coil 4. When the level of the current signal Vi reaches the voltage error signal Ve, in contrast, the pulse-width control circuit 12 restricts the on period of the switch element 5 so that the level of the current signal Vi does not exceed the voltage error signal Ve. FIG. 2(b) shows the operation described above. Therefore, the current I1 flowing through the choke coil 4 has a waveform shown in FIG. 2(c). An input AC current Ii which is obtained by smoothing the current I1 by means of the input filter has a trapezoidal waveform shown in FIG. 2(d).

As described above, according to the embodiment, the control circuit 15 can be constituted by a conventional control IC for a current-mode switching regulator, and without using a multiplying circuit, etc. Furthermore, while the output voltage is substantially stabilized, the input AC current Ii has a trapezoidal waveform, and the converter has characteristics of a high power factor and harmonic currents of reduced levels. Since a trapezoidal waveform which is lower in peak level than a sinusoidal waveform is obtained, moreover, the converter has a feature that the current stress imposed on the choke coil 4 and the switch element 5 can be relieved.

Figure 3A:
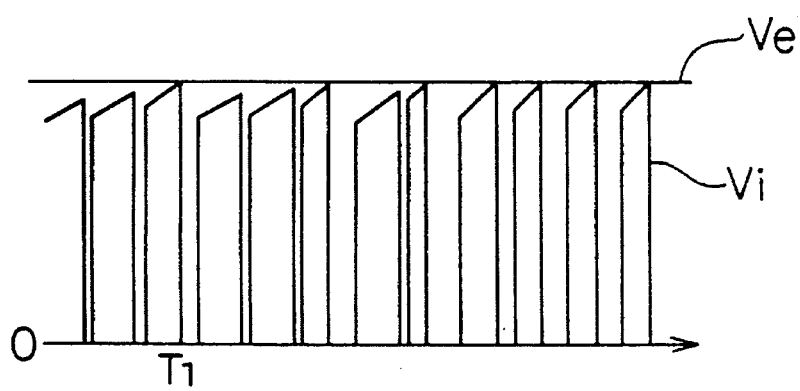
FIG. 3 is a waveform chart showing the operation of the AC-DC converter of the invention.
Figure 3B:
Figure 4A:
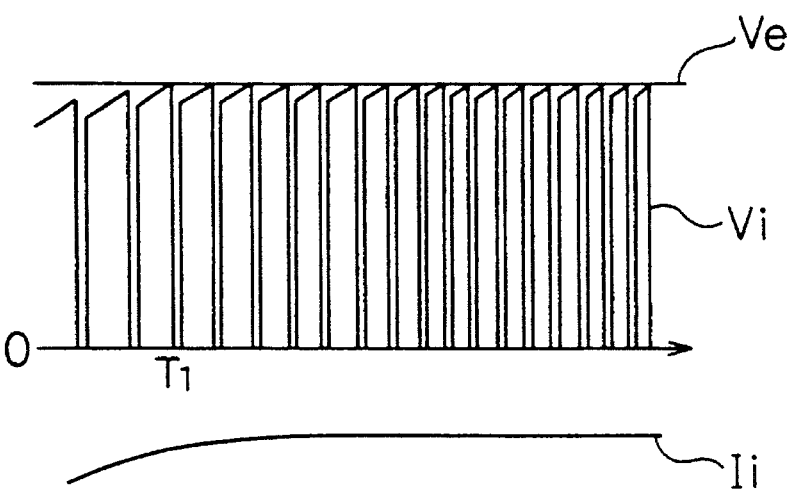
FIG. 4 is a waveform chart showing the operation of the AC-DC converter of the invention.
Figure 4B:
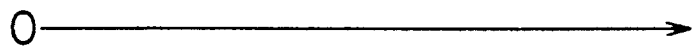

In the embodiment, the switching frequency of the switch element 5 is set so as to be sufficiently higher than the frequency of the input AC voltage. As compared with the case where the switching frequency is fixed, the levels of harmonic currents can be reduced by a larger degree in the case where the off period is fixed and the on period is controlled. The reason of this phenomenon will be described with reference to FIGS. 3 and 4. FIG. 3 shows the operation which is conducted when the level of the current signal Vi reaches that of the voltage error signal Ve in the case of a fixed frequency. When the level of the current signal Vi reaches for the first time that of the voltage error signal Ve at time T1, the on period of the switch element 5 which has operated in the maximum on period up to that time is suddenly shortened, and the off period is extended by the period corresponding to the shortened period. This causes the choke coil 4 to be deenergized to a level lower than required, and several switching periods are passed before the level of the current signal Vi again reaches that of the voltage error signal Ve. The above-mentioned operation is repeated until the level of the current signal Vi can reach that of the voltage error signal Ve within each switching period (see FIG. 3(a)). In the waveform of the input current Ii in the period corresponding to this portion, therefore, there appears an oscillation waveform so that harmonic currents are increased in level. By contrast, in the case where the off period is fixed, when the level of the current signal Vi reaches for the first time that of the voltage error signal Ve at time T1, the on period of the switch element 5 which has operated in the maximum on period up to that time is suddenly shortened, but the off period is not extended. Consequently, the degree of deenergizing the choke coil 4 is not changed. As shown in FIG. 4(a), the state of the maximum on period is transferred to the pulse-width control state in a relatively smooth manner. Also in the waveform of the input AC current Ii, as shown in FIG. 4(b), an oscillation waveform does not appear or appears in a suppressed level, thereby reducing the levels of harmonic currents.

Figure 5:
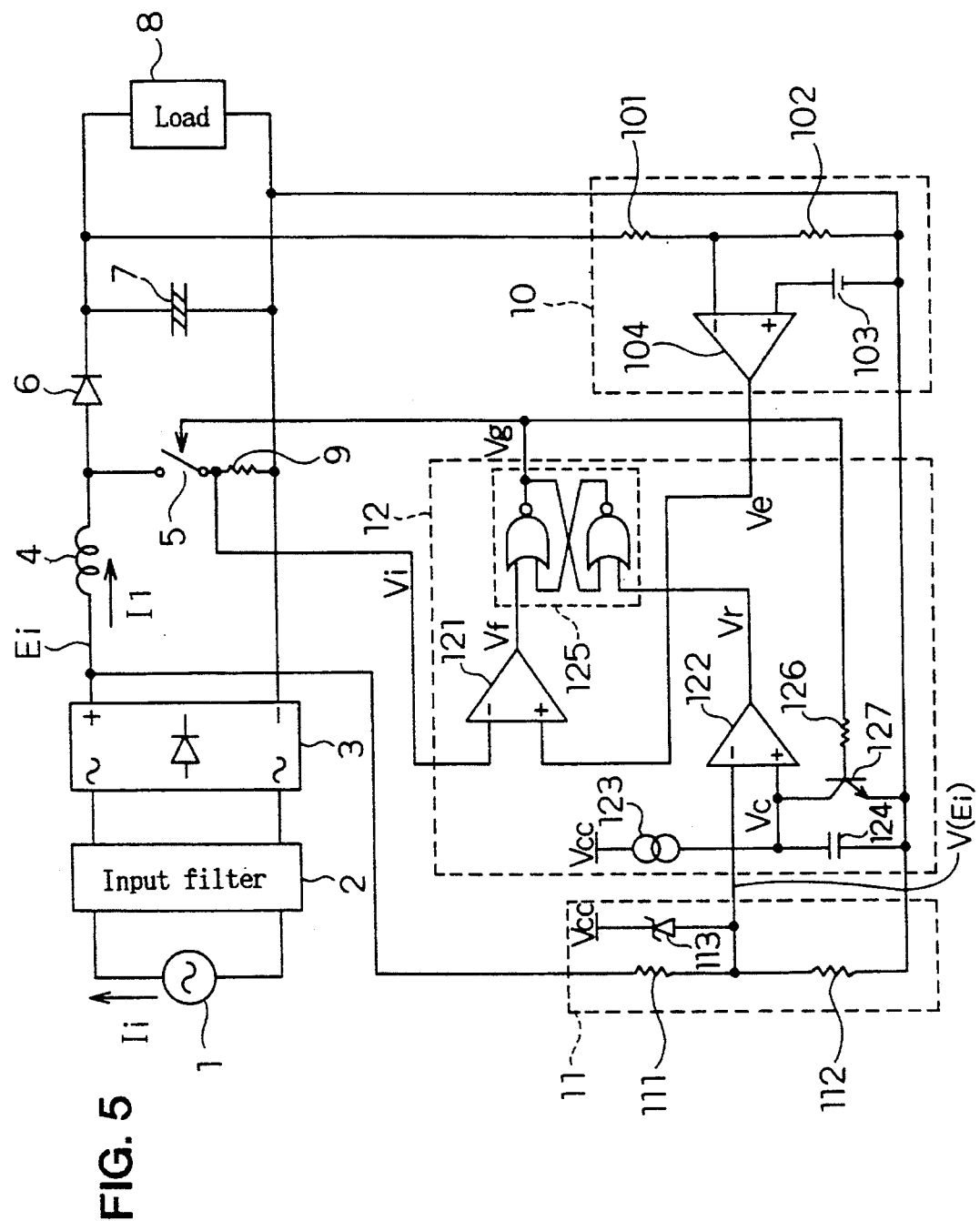
FIG. 5 is a circuit diagram of the AC-DC converter of the invention.
Figure 6A:
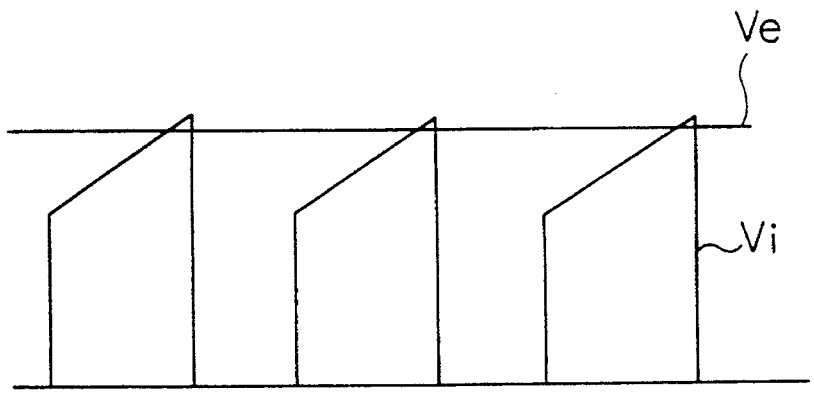
FIG. 6 is a waveform chart showing waveforms appearing at main portions in FIG. 5.
Figure 6B:
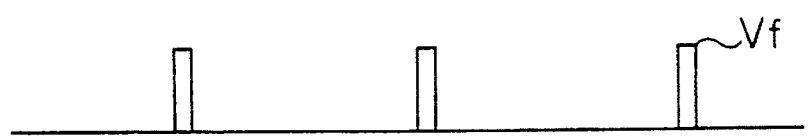
Figure 6C:
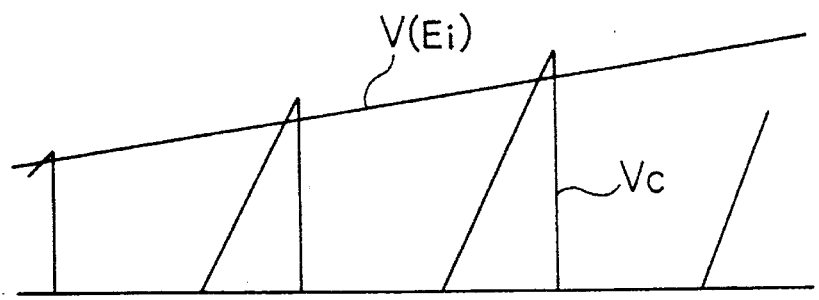
Figure 6D:
Figure 6E:
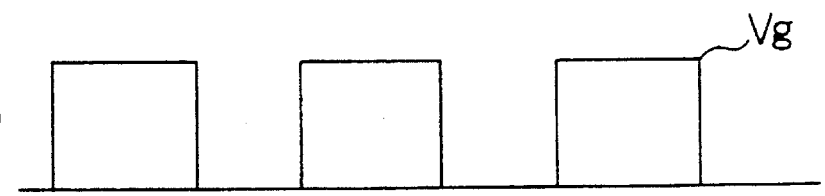

Furthermore, it is preferable to control the off period of the switch element 5 in such a manner that, when the rectified voltage Ei is low, the off period is short, and, when the voltage Ei is high, the off period is long. For example, the case where the rectified voltage Ei is 360|sin θ|[V], the output voltage Eo is 370 [V], and the current flowing through the choke coil 4 in the period from θ=π/6 to 5 π/6 is continuous will be considered. When the off period Toff of the switch element 5 is fixed to be 10 [μsec], the on period Ton varies in the range of 0.28 and 10.56 [μsec]. By contrast, when the off period Toff of the switch element 5 is made proportional to the rectified voltage Ei so that Toff=10|sin θ|[μsec](θ=π/6 to 5 π/6), Toff varies in the range of 5 to 10 [μsec], and Ton varies in the range of 0.28 to 5.28 [μsec]. Namely, the variation range of Ton can be reduced to one half of that of the above case under the same conditions. In other words, a wider control ability is attained. FIG. 5 is a circuit diagram of the AC-DC converter of the invention which shows in more detail the control circuit 14 for realizing the above-mentioned control operation. FIG. 6 is a waveform chart showing waveforms appearing at various portions. The current detection circuit 9 detects the current of the switch element 5 with using a resistor, and outputs the signal Vi. In the first voltage detection circuit 10, the output voltage is divided by detection resistors 101 and 102. An error amplifier 104 compares a divided voltage with a reference voltage 103 and outputs the voltage error signal Ve. The signals Vi and Ve are shown in FIG. 6(a). A second voltage detection circuit 11 divides the rectified voltage Ei by means of resistors 111 and 112, and outputs a signal V(Ei) which corresponds to the rectified voltage El. In order to cause the signal V(Ei) to have the minimum value when the rectified voltage Ei is low, a Zener diode 113 is connected to the circuit. The pulse-width control circuit 12 comprises comparators 121 and 122, a constant current source 123, a capacitor 124, a flip-flop 125, a resistor 126, and a transistor 127. The comparator 121 compares the signals Vi and Ve with each other, and outputs a turn-off pulse signal Vf. FIG. 6(b) shows the signal Vf. The capacitor 124 is charged by the constant current source 123 during the switch element 5 is off, and the comparator 122 compares the voltage Vc of the capacitor with the signal V(Ei). FIG. 6(c) shows the voltage Vc of the capacitor 124 and the signal V(Ei). The comparator 122 outputs a turn-on pulse signal Vr. FIG. 6(d) shows the signal Vr. The flip-flop 125 receives the signals Vr and Vf and outputs a driving pulse signal Vg to the switch element 5. The driving pulse signal Vg is shown in FIG. 6(e). The resistor 126 and the transistor 127 cooperate to cause the capacitor 124 to be discharged during the on period of the switch element 5. The symbol Vcc indicates a bias voltage by which the control circuit 14 is operated, and which is stabilized. In this configuration, the on period of the switch element 5 is determined so as to stabilize the output voltage, and the off period is determined so as to be proportional to the charge period of the capacitor 124 or to the rectified voltage Ei. Even when the voltage Ei is in the vicinity of 0 [V], the signal V(Ei) has the minimum value. Therefore, the off period can be ensured to have the minimum off period.

Although not described in the description of the configuration of FIG. 1, it is apparent that, if the resistor 111 is not disposed, the operation of fixing the off period can be conducted.

Figure 7:
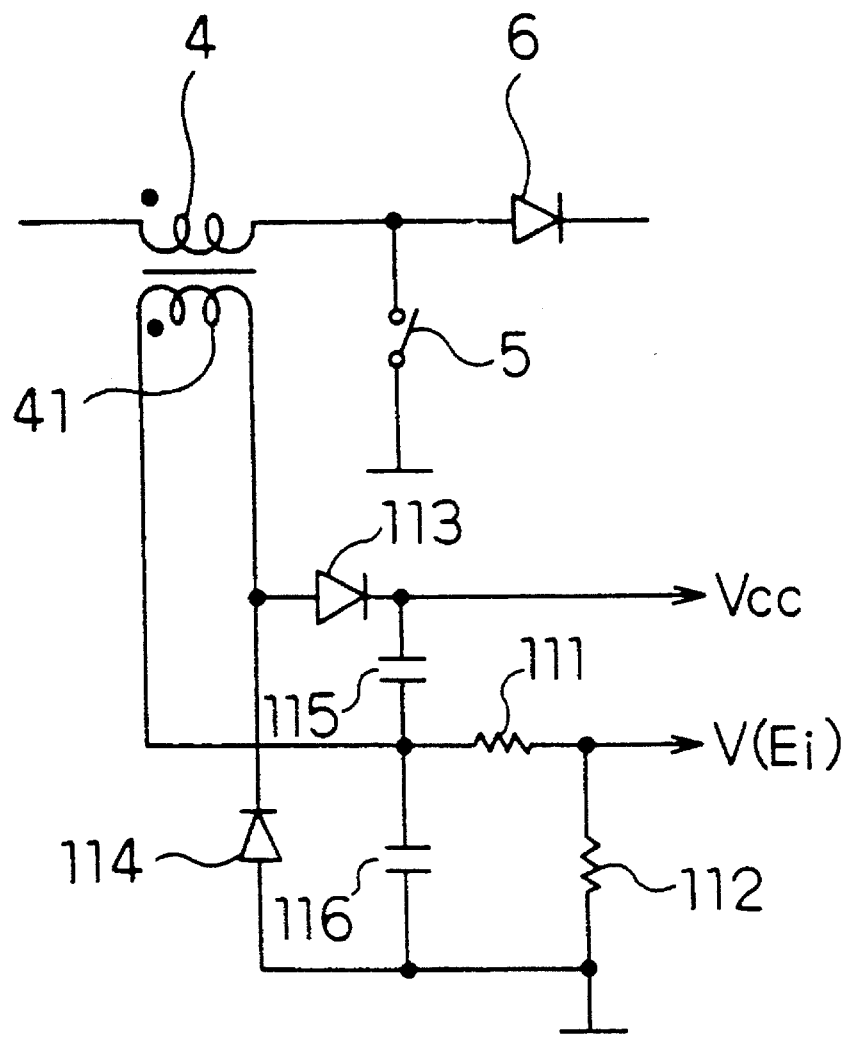
FIG. 7 is a circuit diagram showing another embodiment of a second voltage detection circuit in FIG. 5.

In the second voltage detection circuit 11 shown in FIG. 5, the rectified voltage Ei is divided by the resistors 111 and 112, and the resulting signal V(Ei) is output. Alternatively, a voltage which is generated across an additional winding 41 wound on the choke coil 4 may be used as shown in FIG. 7. In the alternative shown in FIG. 7, the voltage which is generated across the additional winding 41 is subjected to the voltage-double rectification by a combination of diodes 113 and 114 and capacitors 115 and 116, and the bias voltage which is stable and proportional to the output voltage is supplied to the control circuit 14. Since the forward voltage generated across the additional winding 41 is rectified and smoothed, a voltage which is proportional to the rectified voltage Ei appears at a capacitor 116, and the voltage is divided by the resistors 111 and 112, thereby outputting the signal V(Ei).

What is claimed is:

1. An AC-DC converter comprising:

a rectifying circuit which (1) receives an input AC current having an AC waveform and an input AC voltage and (2) produces a rectified voltage;

a converter circuit comprising a choke coil which receives the rectified voltage, a switch element, and a diode;

a smoothing capacitor which smoothes an output voltage of said converter circuit and supplies the smoothed voltage to a load circuit; and control circuit means for switching said switching element on and off to restrict a peak value of an input current of said converter circuit in order to substantially stabilize said output voltage and for shaping the AC waveform to a trapezoidal shaped waveform to improve a power factor of the AC-DC converter.

2. An AC-DC converter according to claim 1, wherein said control circuit comprises:

a current detection circuit which detects a current of said choke coil or said switch element;

a voltage detection circuit which detects the output voltage of said converter circuit, compares the detected output voltage with a reference voltage, and detects a voltage error; and a pulse-width control circuit which compares an output of said current detection circuit with an output of said voltage detection circuit to control a pulse width of a driving pulse signal to switch said switch element on and off and to restrict a peak current of said choke coil or a peak current of the switching element to substantially stabilize said output voltage.

3. An AC-DC converter according to claim 2, wherein said control circuit means is further for varying an on period of said switch element and maintaining an off period of said switch element constant.

4. An AC-DC converter according to claim 1, wherein said control circuit comprises:

a current detection circuit which detects a current of said choke coil or said switch element;

a first voltage detection circuit which detects the output voltage of said converter circuit, compares the detected output voltage with a reference voltage, and detects a voltage error;

a second voltage detection circuit which detects the rectified voltage; and a pulse-width control circuit which (1) compares an output of said current detection circuit with an output of said first voltage detection circuit, to control a pulse width of a driving pulse signal to switch said switch element on and off to restrict a peak current of said choke coil or the switching element, to substantially stabilize the output voltage, and (2) provides the driving pulse signal to make the off period of said switch element longer when the restricted voltage is higher in response to an output of said second voltage detection circuit.

5. An AC-DC converter according to claim 4, wherein said second voltage detection circuit also detects the rectified voltage from a voltage which appears in an additional winding formed in said choke coil.

6. The AC-DC converter according to claim 1 wherein the control circuit means switches said switching element on and off to linearly restrict the peak value of the input current of said converter circuit.

7. The AC-DC converter according to claim 4 wherein the pulse-width control circuit switches said switching element on and off to linearly restrict the peak value of said choke coil or the switching element.

* * * * *

UNITED STATES PATENT AND TRADEMARK OFFICE
CERTIFICATE OF CORRECTION

PATENT NO. : 5,615,098
DATED : March 25, 1997
INVENTOR(S) : Ishii et al.

It is certified that error appears in the above-identified patent and that said Letters Patent is hereby corrected as shown below:

On the title page, item: [73] (Assignee), add the following Assignee after Matsushita Electric Industrial Co., Ltd.:

Shindengen Electric Mfg. Co., Ltd.
10-13 Minami-cho, Hanno-shi, Saitama    JAPAN Signed and Sealed this Twenty-seventh Day of January, 1998

Attest:

BRUCE LEHMAN

Attesting Officer

Commissioner of Patents and Trademarks